(12) United States Patent
Shen et al.

(10) Patent No.: US 9,725,324 B2
(45) Date of Patent: Aug. 8, 2017

(54) GRAPHENE QUANTUM DOTS SYNTHESIS METHOD

(71) Applicant: CHUNG YUAN CHRISTIAN UNIVERSITY, Taoyuan (TW)

(72) Inventors: Ji-Lin Shen, Taoyuan (TW); Tzu-Neng Lin, Taoyuan (TW); Ken-Hua Chih, Taoyuan (TW)

(73) Assignee: CHUNG YUAN CHRISTIAN UNIVERISTY, Taoyuan (TW)

( * ) Notice: Subject to any disclaimer, the term of this patent is extended or adjusted under 35 U.S.C. 154(b) by 250 days.

(21) Appl. No.: 14/808,630

(22) Filed: Jul. 24, 2015

(65) Prior Publication Data

US 2016/0200582 A1 Jul. 14, 2016

(30) Foreign Application Priority Data

Jan. 8, 2015 (TW) .............................. 104100497 A

(51) Int. Cl.
*C01B 31/04* (2006.01)
*B82Y 40/00* (2011.01)

(52) U.S. Cl.
CPC ...... *C01B 31/0476* (2013.01); *C01B 31/0492* (2013.01); *B82Y 40/00* (2013.01); *Y10S 977/774* (2013.01); *Y10S 977/888* (2013.01)

(58) Field of Classification Search
CPC . C01B 31/0476; C01B 31/0492; B82Y 40/00; B82Y 5/00; Y10S 977/774; Y10S 977/888
See application file for complete search history.

(56) References Cited

PUBLICATIONS

Atienzar, Pedro, et al. "Preparation of graphene quantum dots from pyrolyzed alginate." Langmuir 29.20 (2013): 6141-6146.*
Liu, Fei, et al. "Facile synthetic method for pristine graphene quantum dots and graphene oxide quantum dots: origin of blue and green luminescence." Advanced Materials 25.27 (2013): 3657-3662.*

* cited by examiner

*Primary Examiner* — Richard M Rump
(74) *Attorney, Agent, or Firm* — Muncy, Geissler, Olds & Lowe, P.C.

(57) ABSTRACT

A graphene quantum dots synthesis method includes fixing a graphene aqueous solution or a graphene oxide aqueous solution on a spin coater to spin the graphene aqueous solution or the graphene oxide aqueous solution, and irradiating a pulsed laser to focus on a graphene aqueous solution or a graphene oxide aqueous solution to generate exfoliation. After a processing period, quantum dots are generated in the graphene aqueous solution or the graphene oxide aqueous solution. Since graphene aqueous solution or graphene oxide aqueous solution does not contain organic chemistry pharmacy, the quantum dots synthesized by the method of the present invention can be produced without pollution. Furthermore, the purpose of simple process, low cost, and time-saved of synthesis can be achieved.

6 Claims, 6 Drawing Sheets

GRAPHENE QUANTUM DOTS SYNTHESIS METHOD

FIELD OF THE INVENTION

The present invention relates to a method of synthesizing graphene quantum dots, and in particular to a method of synthesizing grapheme quantum dots of a graphene aqueous solution or a graphene oxide aqueous solution.

BACKGROUND OF THE INVENTION

Quantum dots are widely used due to their characteristics of excellent luminance and light absorption, purity color, and color saturation. The application range includes light sensors, single electron transistors, memories, catalysts, or quantum calculation. In the biomedical engineering, for example, the quantum dots can be manufactured to be any kinds of fluorescent labels, gene barcodes and protein barcodes applied for biological inspection, comparison symbols of magnetic resonance image and positron emission tomography used in human body, and evaluation of cancer diagnosis and medication.

Currently, the graphene quantum dots are produced by chemical material synthesis. However, the chemical material synthesis method needs several complex procedures which result in consuming time, and also, the graphene quantum dots synthesized by the chemical synthesis should take any environmental conditions into consideration. Besides, the chemical material brings the pollutions to environments easily, and therefore, the problem of synthesizing graphene quantum dots with non-pollution, simple procedure, and low cost needs to be solved.

SUMMARY OF THE INVENTION

In order to solve the aforementioned drawbacks, the major objective of the present invention is to provide a method for manufacturing graphene quantum dots by irradiating a pulsed laser to graphene oxide aqueous solution or graphene aqueous solution during the graphene oxide aqueous solution or graphene aqueous solution is spinning at room temperature. During the manufacture process, the nano sheets of the graphene oxide aqueous solution or graphene aqueous solution are exfoliated for a period of time, so that the graphene quantum dots can be produced. In the present invention, the graphene quantum dots or the graphene oxide quantum dots can be produced with advantages such as non-pollution, simple process, low cost, and short synthesis time.

According to the aforementioned objective, the major objective of the present invention is to provide a graphene quantum dots synthesis method which comprises fixing a graphene aqueous solution on a spin coater to spin the graphene aqueous solution, which includes deionized water and multiple graphene sheets, irradiating a pulsed laser outputted from a laser source to focus on the spinning graphene aqueous solution, exfoliating the multiple graphene sheets of the graphene aqueous solution, and forming multiple graphene quantum dots with nano-size in the graphene aqueous solution.

Another major objective of the present invention is to provide a graphene quantum dots synthesis method which comprises fixing a graphene oxide aqueous solution on a spin coater to spin the graphene oxide aqueous solution, which includes deionized water and multiple graphene oxide sheets, irradiating a pulsed laser outputted from a laser source to focus on the spinning graphene oxide aqueous solution, exfoliating the graphene oxide sheets of the graphene oxide aqueous solution, and fabricating multiple grapheme quantum dots with nano-size in the graphene oxide aqueous solution.

According to abovementioned, the objective of synthesizing the graphene quantum dots or the graphene oxide quantum dots with non-pollution, simple process, low cost, and short synthesis time can be achieved.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

The present invention provides a method of synthesizing graphene quantum dots, the manufacture process of graphene aqueous solution or the graphene oxide aqueous solution have been understood by who has knowledge of the relevant art with the related technologies. Thus, some sample embodiments of the invention will not be described in greater detail. Nevertheless, it should be recognized that the present invention can be practiced in a wide range of other embodiments besides those explicitly described, and the scope of the present invention is expressly not limited except as specified in the accompanying claims.

Figure 1:
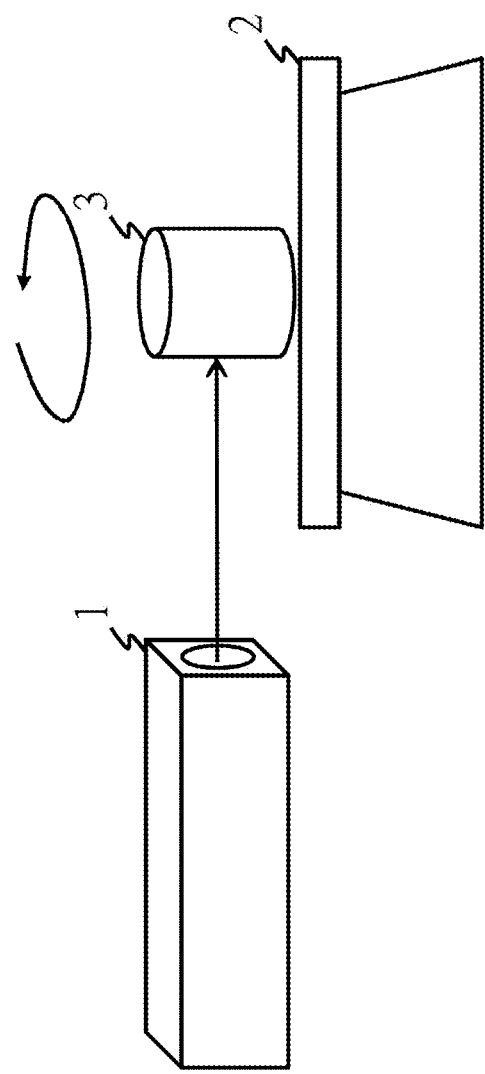
FIG. 1 shows a diagram of synthesizing graphene quantum dots of the graphene aqueous solution of an embodiment of the present invention.
Figure 3:
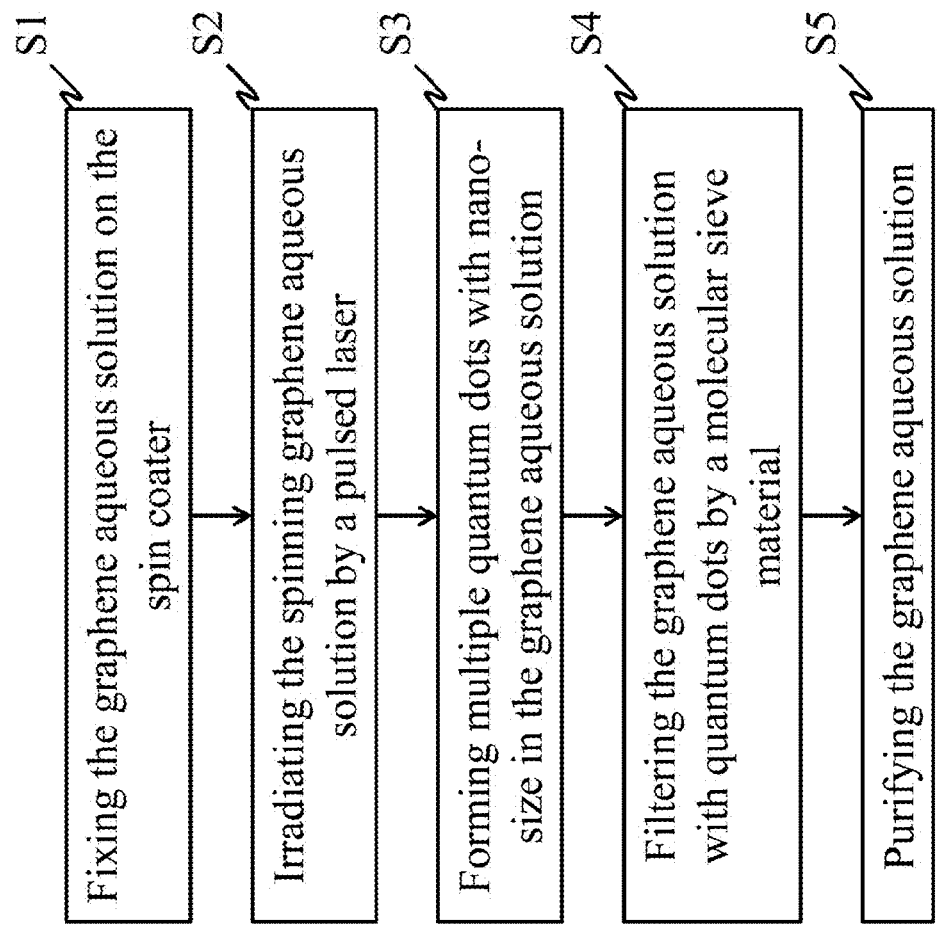
FIG. 3 shows a flowchart of synthesizing graphene quantum dots of the graphene aqueous solution of the embodiment of the present invention.
Figure 5:
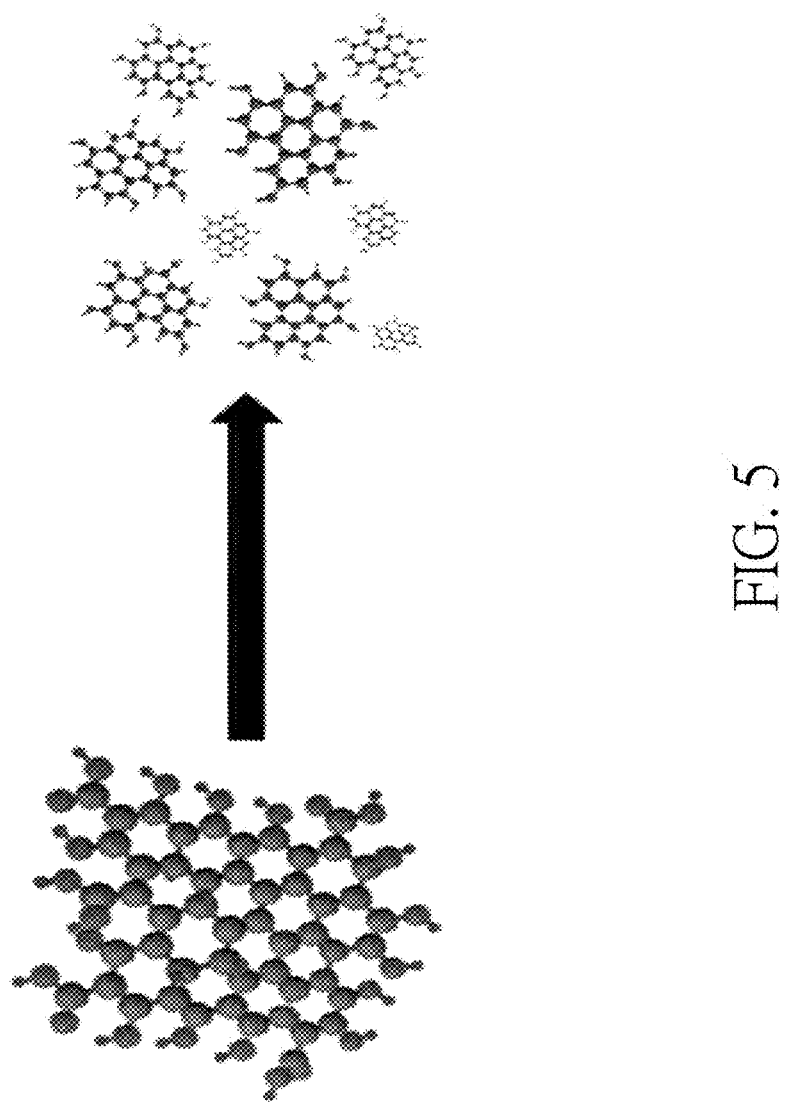
FIG. 5 shows the quantum dots produced after exfoliation of the embodiment of the present invention.

First, please refer to FIG. 1, FIG. 3, and FIG. 5. FIG. 1 shows a diagram of synthesizing quantum dots of the graphene aqueous solution of an embodiment of the present invention. FIG. 3 shows a flowchart of synthesizing quantum dots of the graphene aqueous solution of the embodiment of the present invention. FIG. 5 shows the quantum dots produced after exfoliation of the embodiment of the present invention.

In the step S1, the graphene aqueous solution 3 which is mixed by deionized water and multiple graphene sheets is sealed in a container with room temperature condition, and then the graphene aqueous solution 3 is fixed on the spin coater 2 to be spanned or rotated.

Next, in the step S2, the spinning graphene aqueous solution 3 is irradiated by a pulsed laser outputted from a laser source 1 to focus on the graphene aqueous solution 3 uniformly. Besides, the optimal condition of pulsed laser energy is greater than 40 mJ, and the revolution per minute (RMP) of the spin coater 2 is set to be 80.

Figure 6:
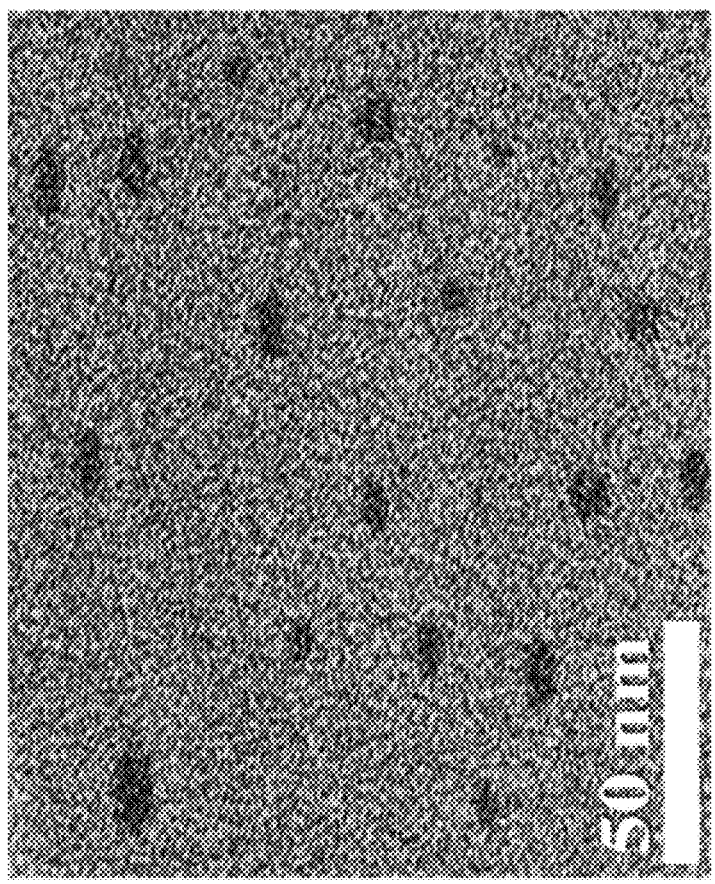
FIG. 6 shows the picture of the quantum dots captured by transmission electron microscope.

In the following step S3, the multiple graphene sheets of the graphene aqueous solution 3 are exfoliated during the pulsed laser uniformly irradiates to the graphene aqueous solution 3. After exfoliating for five minutes, the multiple graphene quantum dots with nano-size are fabricated as shown in FIG. 5. The left side of FIG. 5 shows the structure of one of the multiple graphene sheets which did not synthesize to form the graphene quantum dots in the graphene aqueous solution, and the right side of FIG. 5 shows several graphene quantum dots after the graphene sheets are exfoliated for a period of time. More specifically, several synthesized graphene quantum dots pictured by the transmission electron microscope are shown in FIG. 6, and the dimension of an average size of each graphene quantum dot is 14 nanometers.

After that, in the step S4, the graphene aqueous solution 3 with synthesized graphene quantum dots is filtered by a molecular sieve material for eliminating unnecessary impurities in the graphene aqueous solution 3.

Finally, in the step S5, the graphene aqueous solution 3 is purified by a centrifuge with conditions of revolution per minute of 6000. After step S4 and S5, the properties of the graphene quantum dots will not be influenced by unnecessary impurities.

Figure 2:
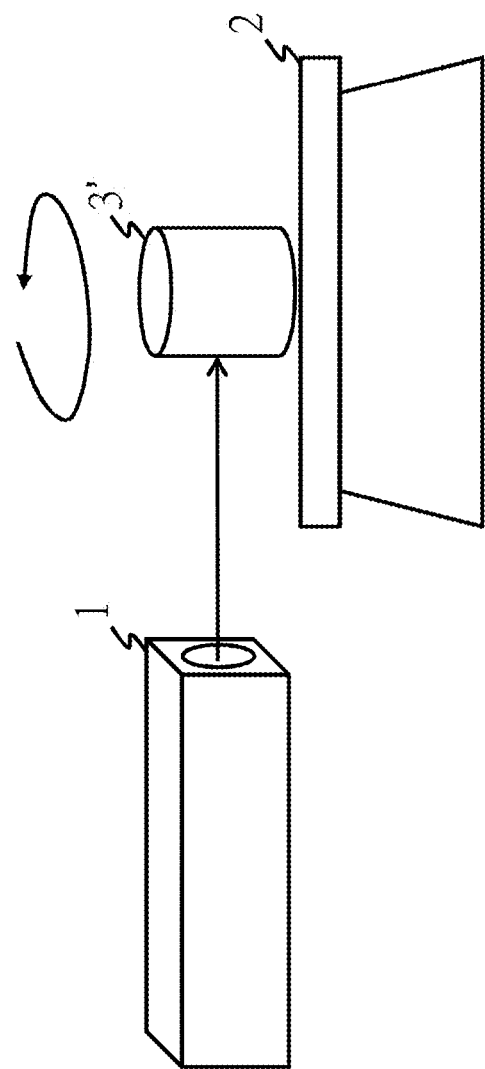
FIG. 2 shows a diagram of synthesizing graphene oxide quantum dots of the graphene oxide aqueous solution of another embodiment of the present invention.
Figure 4:
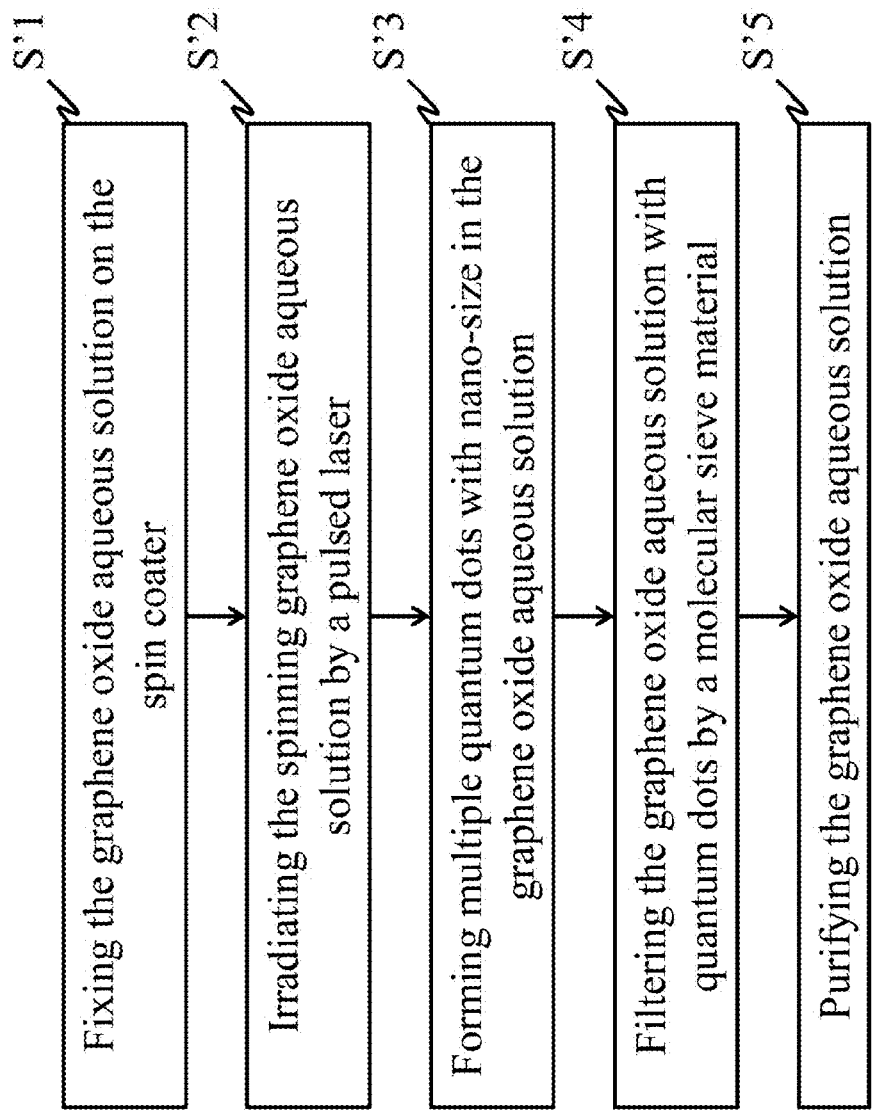
FIG. 4 shows a flowchart of synthesizing graphene oxide quantum dots of the graphene oxide aqueous solution of another embodiment of the present invention.

Next, please refer to FIG. 2, FIG. 4, and FIG. 5. FIG. 2 shows a diagram of synthesizing quantum dots of the graphene oxide aqueous solution of another embodiment of the present invention. FIG. 4 shows a flowchart of synthesizing quantum dots of the graphene oxide aqueous solution of another embodiment of the present invention. FIG. 5 shows the quantum dots produced after exfoliation of the embodiment of the present invention.

First, in step S'1, the graphene oxide aqueous solution 3' which is mixed by deionized water and several graphene oxide sheets is sealed in a container with room temperature condition, and then the graphene oxide aqueous solution 3' is fixed on the spin coater 2 to be spanned or rotated.

Next, in the step S'2, the spinning graphene oxide aqueous solution 3' is irradiated by a pulsed laser outputted from the laser source 1 to focus on the graphene oxide aqueous solution 3' uniformly. Besides, the optimal condition of pulsed laser energy is greater than 40 mJ, and the revolution per minute (RPM) of the spin coater is set to be 80.

In the following step S'3, the multiple graphene oxide sheets of the graphene oxide aqueous solution 3' are exfoliated during the pulsed laser uniformly irradiates to the graphene oxide aqueous solution 3'. After exfoliating for 20~30 minutes, multiple graphene oxide quantum dots with nano-size are fabricated as shown in FIG. 5. The left side of FIG. 5 shows the structure of one of multiple graphene oxide sheets which did not synthesize to form the graphene quantum oxide dots in the graphene oxide aqueous solution, and the right side of FIG. 5 shows several graphene oxide quantum dots after the graphene oxide sheets are exfoliated for a period of time. More specifically, several synthesized graphene oxide quantum dots pictured by the transmission electron microscope are shown in FIG. 6, and the dimension of an average size of each graphene oxide quantum dot is 14 nanometers.

After that, in the step S'4, the graphene oxide aqueous solution 3' with synthesized graphene oxide quantum dots is filtered by a molecular sieve material for eliminating unnecessary impurities in the graphene oxide aqueous solution 3'.

Finally, in the step S'5, the graphene oxide aqueous solution 3' is purified by a centrifuge with conditions of revolution per minute of 6000. After step S'4 and S'S, the properties of the graphene oxide quantum dots will not be influenced by unnecessary impurities.

In the aforementioned embodiment of present invention, the amount of oxygen functional groups of the graphene oxide sheets is greater than that of the graphene sheets, so that the exfoliate and synthesis time for the graphene oxide aqueous solution 3' is greater than that of the graphene aqueous solution.

In the aforementioned embodiment of the present invention, the optimal particle size of the molecular sieve material is 0.22 μm, however, the particle size of the molecular sieve material depends on demands of the users, and the invention is not limited herein.

In the present invention, the pulsed laser energy is set greater than 40 mJ that is sufficient to exfoliate the graphene sheets or graphene oxide sheets, and thus shortening the synthesis time of quantum dots.

Besides, defects of the quantum dots and bounds of the functional group of the synthesized graphene quantum dots of the present invention can lead to photoluminescence with blue-green waveband range of 400~600 nm. Moreover, the method of synthesizing quantum dots of the present invention does not include any chemicals, such as oxidizer, reducing agent, and catalyst, and hence the synthesis method of the present invention does not need many chemical processes and cause pollution, and also the method of the present invention will not produce excess compound except for quantum dots, and the quantum dots can be synthesized at room temperature. Therefore, the purpose of successfully synthesizing the graphene quantum dots or the graphene oxide quantum dots with non-pollution, simple process, low cost, high purity, and short synthesis time can be achieved.

Furthermore, the graphene quantum dots and graphene oxide quantum dots synthesized by the method of the present invention are non-toxic carbon substrate, thus the graphene quantum dots and graphene oxide quantum dots have high biocompatibility to be able to apply in biomedical engineering, for example, the quantum dots can be applied to fluorescent labels, but it is not limited herein. The quantum dots can be also used to light sensors, single electron transistors, memories, and catalysts, but it is not limited herein.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A graphene quantum dots synthesis method, comprising:
    fixing a graphene aqueous solution on a spin coater to spin the graphene aqueous solution, and the graphene aqueous solution includes deionized water and multiple graphene sheets;
    irradiating a pulsed laser outputted from a laser source to focus on the spinning of the graphene aqueous solution;
    exfoliating the multiple graphene sheets of the graphene aqueous solution; and
    forming multiple quantum dots with nano-size in the graphene aqueous solution.

2. The graphene quantum dots synthesis method according to claim 1, further comprising:
    filtering the graphene aqueous solution by a molecular sieve material to eliminate the impurities of the graphene aqueous solution; and
    purifying the graphene aqueous solution by a centrifuge.

3. The graphene quantum dots synthesis method according to claim 1, wherein the pulsed laser energy is greater than 40 mJ.

4. A graphene quantum dots synthesis method, comprising:
- fixing a graphene oxide aqueous solution on a spin coater to spin the graphene oxide aqueous solution, and the graphene oxide aqueous solution includes deionized water and multiple graphene oxide sheets;
- irradiating a pulsed laser outputted from a laser source to focus on the spinning of the graphene oxide aqueous solution;
- exfoliating the multiple graphene oxide sheets of the graphene oxide aqueous solution; and
- forming multiple quantum dots with nano-size in the graphene oxide aqueous solution.

5. The graphene quantum dots synthesis method according to claim 4, further comprising:
- filtering the graphene oxide aqueous solution by a molecular sieve material to eliminate the impurities of the graphene oxide aqueous solution; and
- purifying the graphene oxide aqueous solution by a centrifuge.

6. The graphene quantum dots synthesis method according to claim 4, wherein the pulsed laser energy is greater than 40 mJ.

\* \* \* \* \*